UNITED STATES PATENT OFFICE.

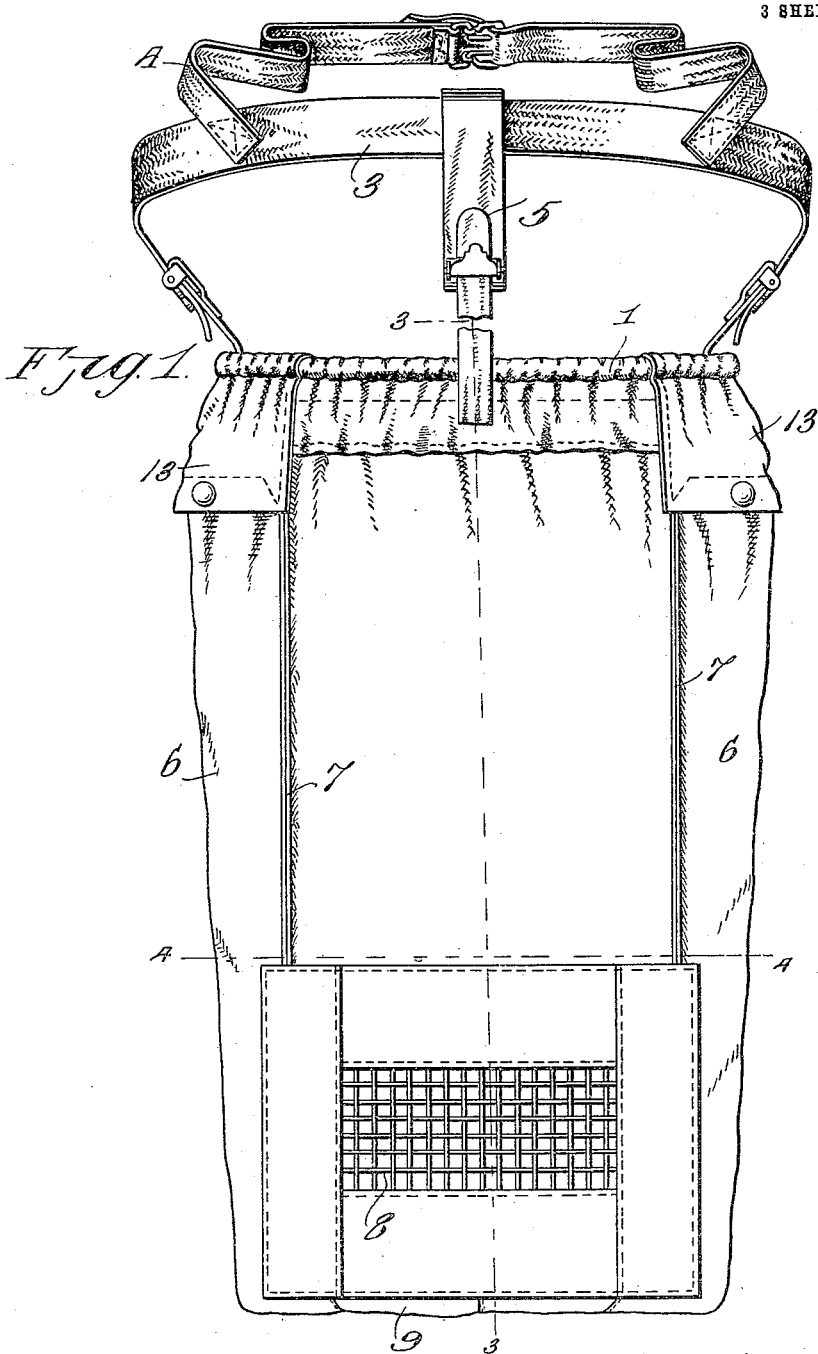

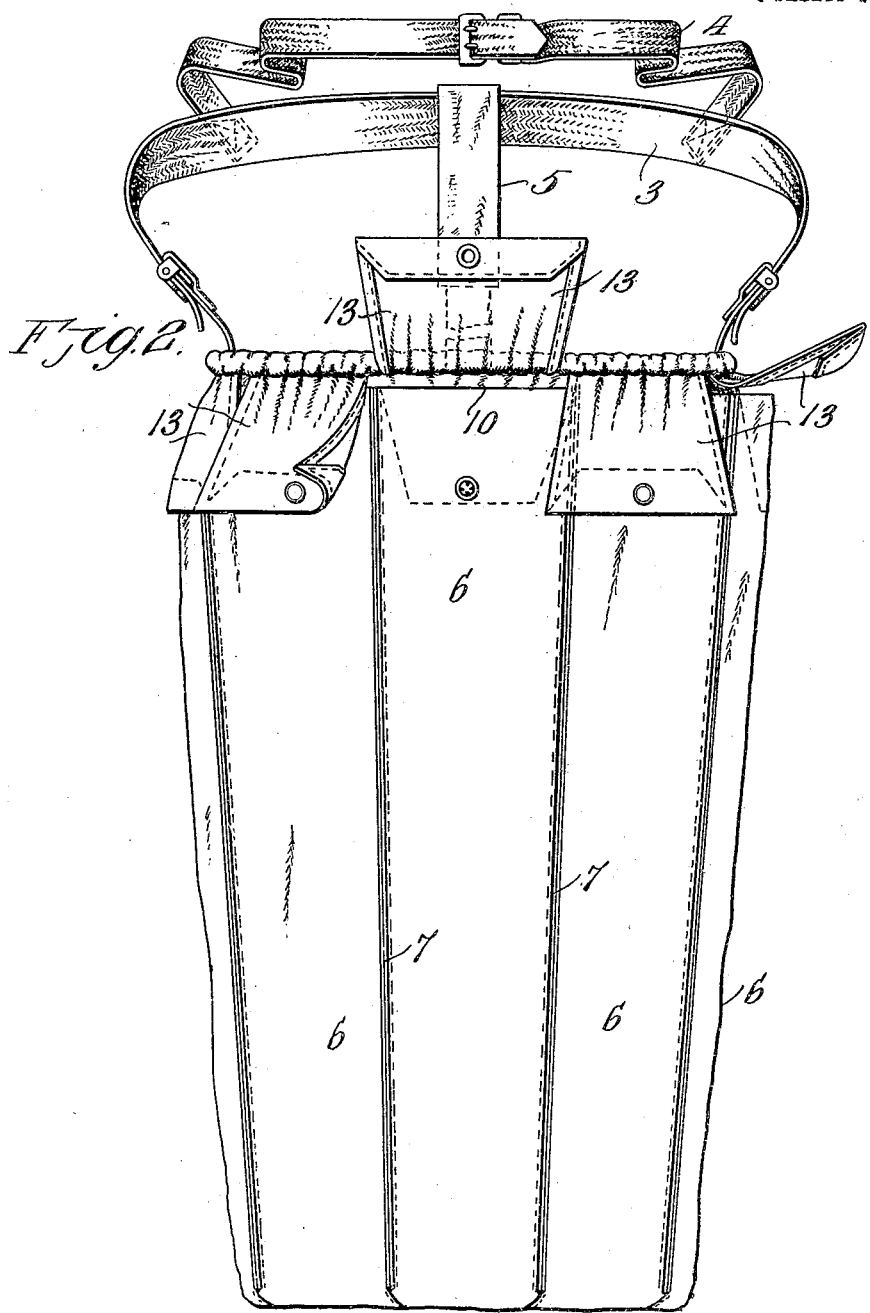

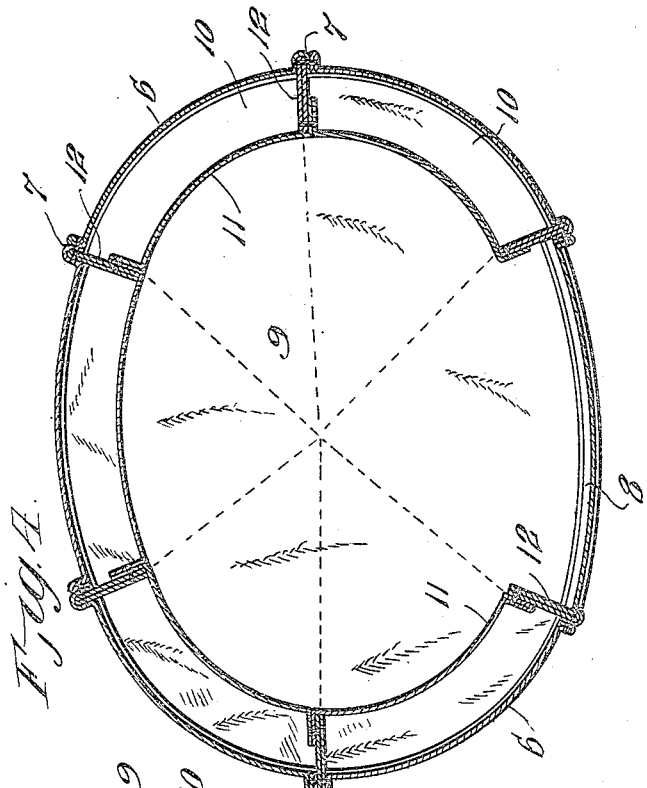
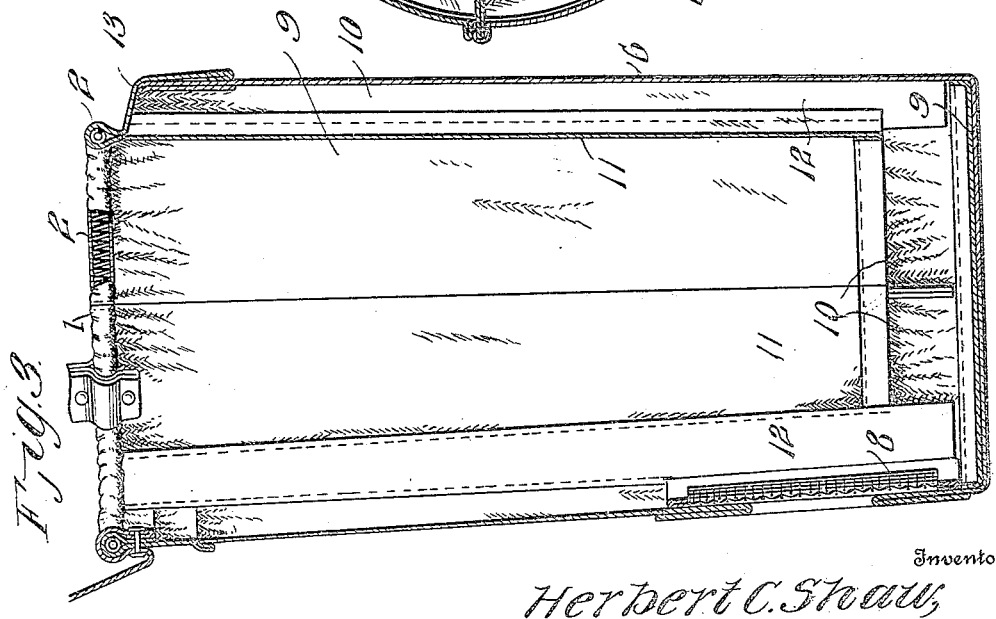

HERBERT C. SHAW, OF CHICAGO, ILLINOIS.

FEED-BAG.

979,345.

Specification of Letters Patent.

Patented Dec. 20, 1910.

Application filed August 10, 1909. Serial No. 512,198.

*To all whom it may concern:*

Be it known that I, HERBERT C. SHAW, a citizen of the United States, residing at Chicago, in the county of Cook and State of Illinois, have invented new and useful Improvements in Feed-Bags, of which the following is a specification.

The purpose of the present invention is the provision of a feeding device of the variety to be attached to the head of an animal to admit of feeding while in harness or left standing in the street, roadway, or other public place, the purpose being to prevent waste of feed and to admit of ample ventilation so that the animal will not be fretted or annoyed during the feeding operation.

The invention contemplates a feed or nose bag having a series of pockets about the feed space, said pockets opening at their lower ends into the feed space so as to supply the feed thereto in regulated quantity as the feed is consumed by the animal, said pockets being closed at their upper ends to prevent the spilling of the feed by the animal tossing its head.

A further purpose of the invention is the provision of a feed bag of the character aforesaid involving a simple and effective construction and which will be strong and durable and stiffened so as to maintain the pockets in which the grain or feed is placed in bulk.

The invention consists of the novel features, details of construction and combinations of parts which hereinafter will be more particularly set forth, illustrated in the accompanying drawings and pointed out in the appended claims.

Referring to the drawings forming a part of the specification: Figure 1 is a front view of a feed bag embodying the invention. Fig. 2 is a view of the feed bag as seen from the rear, the closures of two of the pockets being opened. Fig. 3 is a vertical transverse section on the line 3—3 of Fig. 1. Fig. 4 is a horizontal section on the line 4—4 of Fig. 1.

Corresponding and like parts are referred to in the following description and indicated in all the views of the drawings by the same reference characters.

The feed bag may be constructed of any suitable material such as duck, or other textile and is provided with suitable straps for suspending the same from the head of the animal. The upper portion of the bag is provided with a hem 1 in which a contractile device 2 is fitted for gathering the upper portion of the bag about the jaws of the animal so as to prevent spilling of the feed when the animal tosses its head. The contractile device 2 may consist of a helical spring or an elastic. The suspending means comprise a head strap 3, a throat latch 4 and an intermediate nose strap 5 to extend between the animal's ears and along its nose. The several straps are adapted to be lengthened or shortened to admit of adapting the feed bag to the head of the animal.

The body of the feed bag may be of any construction and size and as shown consists of a plurality of sections 6, whose lower ends are tapered and bent inwardly and stitched along their meeting edges to form a bottom as indicated in Fig. 4. The sectional formation of the body is advantageous since it results in the formation of vertical seams about the sides of the body and which seams are utilized as stays for stiffening and strengthening the sides of the body. The sectional formation of the body also results in a convenient mode of providing the several vertical pockets ranged about the feed space and in which the grain or other feed is placed in bulk so as to be supplied from the pockets to the feed space as the feed is consumed by the animal. The vertical edge portions of the body sections 6 are folded upon themselves and the folds are placed together and stitched thereby forming outwardly extending seams or welts 7 which subserve the purpose of stays for stiffening and strengthening the sides of the body. An open work 8 is provided in the front portion of the feed bag near the lower end thereof to admit air to the animal during the feeding operation. This open-work may consist of a piece of wire fabric or foraminous metal set in an opening formed in the body of the bag and secured in place and having the same reinforced as indicated most clearly in Fig. 1.

A series of pockets 10 are arranged about the feed space 9 of the bag and are formed between the sections 6 of the body, inner sections 11 and vertical partitions 12. The several parts 1, 11 and 12 are formed of textile or suitable flexible material. The inner sections 11 have their vertical edge portions bent outwardly and stitched together and to the inner edge portions of the partitions 12. The outer edge portions of the partitions 12 are stitched between the adjacent edge portions of the outer or body sections 6. The partitions 12 are formed of heavy tape or other stiff material comprising one or more plies according to the required stiffness of construction required. The upper ends of the inner sections 11 are reinforced either by being doubled upon themselves or having stay pieces stitched or otherwise secured thereto. The lower ends of the inner sections 11 are similarly reinforced and terminate a short distance from the bottom of the bag so as to provide a space below for the passage of the feed from the pockets 10 into the feed space 9. The upper ends of the pockets 10 are closed by flaps 13, the same being secured when closed by suitable fastening means. The flaps 13 are preferably an integral part of the inner sections 11 and extend over the upper ends of the outer or body sections 6 as shown most clearly in Fig. 3. The fold formed between the flaps 13 and the inner sections 11 constitute a hem or tuck in which the contractile or gathering device 2 is located.

In practice, the grain or other feed is placed in the pockets 10 and gradually feeds therefrom into the space 9 as the animal consumes the feed thereby maintaining a given amount of feed in the lower portion of the bag at all times during the feeding operation until all of the feed is consumed. After the pockets 10 have been supplied with the required amount of feed they are closed by folding the flaps 13 thereover and securing said flaps. When the bag is placed in position upon the head of the animal its upper portion is gathered about the jaws by the contractile or drawing device 2 thereby preventing any waste of feed when the animal tosses its head. It will be understood that different kinds of feed may be placed in the various pockets 10, the same mixing in the feed space 9 as the animal feeds. For instance, corn may be placed in one pocket, oats in another pocket, bran in a third pocket, meal in a fourth pocket, and so on, the several feeds mixing in the feed space 9 as the feeding operation progresses. It is thus possible to regulate the amount of any particular feed to be supplied to an animal for a meal according to varying conditions.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what is claimed is—

1. A feed bag having a series of vertically disposed feed containing pockets ranged about its sides, flaps forming parts of the inner walls of said pockets and adapted to close the upper ends of the pockets, and a contractile device fitted in the fold or tuck formed between said flaps and the inner walls of the pockets.

2. A feed bag comprising a plurality of sections having their lower ends tapered, bent inward and secured to form a bottom, and having their vertical edges stitched together, corresponding inner sections having their lower ends spaced from the bottom of the bag and having their vertical edges brought together and stitched, and having their upper end portions extended to form closing flaps, vertical partitions secured between the inner and outer sections and forming therewith a series of feed containing pockets about the sides of the bag, a contractile device fitted to the upper portion of the bag for gathering the same about the jaws of the animal, and means applied to the bag for securing the same to the head of the animal.

In testimony whereof I affix my signature in presence of two witnesses.

HERBERT C. SHAW.

Witnesses:
H. B. BENNETT,
C. F. BENNETT.